US012602940B2

(12) United States Patent
Tang et al.

(10) Patent No.:  US 12,602,940 B2
(45) Date of Patent:      Apr. 14, 2026

(54) SINGLE CELL IDENTIFICATION FOR CELL SORTING

(71) Applicants:SONY GROUP CORPORATION, Tokyo (JP); Sony Corporation of America, New York, NY (US)

(72) Inventors: Haipeng Tang, Sunnyvale, CA (US); Michael Zordan, Boulder Creek, CA (US); Ming-Chang Liu, San Jose, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 353 days.

(21) Appl. No.: 18/071,943

(22) Filed: Nov. 30, 2022

(65) Prior Publication Data

US 2024/0177504 A1      May 30, 2024

(51) Int. Cl.
*G06V 20/69*          (2022.01)
*G06N 3/0464*        (2023.01)
(Continued)

(52) U.S. Cl.
CPC ......... *G06V 20/698* (2022.01); *G06N 3/0464* (2023.01); *G06V 10/44* (2022.01);
(Continued)

(58) Field of Classification Search
CPC ...... G06V 20/698; G06V 10/44; G06V 10/82; G06V 20/695; G06V 20/70;
(Continued)

(56) References Cited

U.S. PATENT DOCUMENTS 11,436,429 B2 *    9/2022    Jaganathan ............ G16B 40/20
2017/0333903 A1    11/2017    Masaeli

FOREIGN PATENT DOCUMENTS

WO      WO-2017053592 A1      3/2017
WO      WO-2022214662 A1      10/2022

OTHER PUBLICATIONS

"Junhua Ding et. al., Validating a Deep Learning Framework by Metamorphic Testing, May 2017, 2017 IEEE/ACM 2nd International Workshop on Metamorphic Testing MET, Argentina" (Year: 2017).*

(Continued)

*Primary Examiner* — Chineyere Wills-Burns
*Assistant Examiner* — Phuong Hau Cai
(74) *Attorney, Agent, or Firm* — Haverstock & Owens, A Law Corporation

(57)            ABSTRACT

The single cell identification described herein utilizes cell image information and extracts cell features with a neural network model to subtly distinguish the noise events from single cells, allowing the user to choose which different types of noise events to exclude depending on the requirement of applications. The fast neural network model is able to extract more abundant and specific cell features than handpicked features, which enables the model to be equipped with higher accuracy and higher discriminative capability of distinguishing noise events and identifying the single cells in real-time. Utilization of a neural network model for real-time single cell identification represents a novel technique never applied before. It allows high discriminative capability and high accuracy compared to traditional FACS (Fluorescence-activated Cell Sorting). The usefulness of this technique is to integrate with any bright-field (BF) model and fluorescence (FL) model to identify single cells for different downstream applications.

12 Claims, 3 Drawing Sheets

Noise events

Aggerate    Doublet    Debris    Edge    Out-of-focus    Detached-bleb    Bleb    Single 100      102      104      106      108      110      112      114

(51) Int. Cl.
| | | |
|---|---|---|
| *G06V 10/44* | (2022.01) | |
| *G06V 10/82* | (2022.01) | |
| *G06V 20/70* | (2022.01) | |

(52) U.S. Cl.
CPC ............ *G06V 10/82* (2022.01); *G06V 20/695* (2022.01); *G06V 20/70* (2022.01); *G06V 2201/03* (2022.01)

(58) Field of Classification Search
CPC ............. G06V 2201/03; G06V 10/764; G06N 3/0464; G06F 18/2431
See application file for complete search history.

(56) References Cited

OTHER PUBLICATIONS

"Weixia Zhang et. al., Refining deep Convolutional Features for Improving Fine-Grained Image Recognition, Apr. 2017, EURASIP Journal on Image and Video Processing, vol. 2017, Article No. 27" (Year: 2017).*

"Jongsoo Park et. al., Holistic SparseCNN: Forging the Trident of Accuracy, Speed, and Size, Aug. 2015, arXiv preprint" (Year: 2015).*

"Jung Sun et. al., Deep Learning-Based Single-Cell Optical Image Studies, Jan. 2020, Journal of Quantitative Cell Science, ISAC, Cytometry Part A" (Year: 2020).*

"Josh Daniel L. Ong et. al., Ensemble Convolutional Neural Networks for the Detection of Microscopic Fusarium Oxysporum, Dec. 2020, Part of the book series: Lecture Notes in Computer Science, LNIP, vol. 12509" (Year: 2020).*

"Miroslav Hejna et. al., High Accuracy Label-Free Classification of Single-Cell Kinetic States from Holographic Cytometry of Human Melanoma Cells, 2017, Scientific Reports 7, Article No. 11943" (Year: 2017).*

"Nao Nitta et. al., Intelligent Activated Cell Sorting, Sep. 2018, Cell Resource vol. 175, Issue 1".*

"Xuan Liu et. al., Knowledge-Based Classification of Fine-Grained Immune Cell Types in Single-Cell RNA-Seq Data, Sep. 2021, Briefings in Bioinformatics, vol. 22, Issue 5, bbab039" (Year: 2021).*

"Science & Technology, A Chip That can Classify Nearly Two Billion Images per Second, Jun. 6, 2022, Penn Today" (Year: 2022).*

"David T. Martin et. al., Quantitative Automated Image Analysis System with Automated Debris Filtering for the Detection of Breast Carcinoma Cells, Apr. 2011, Acta Cytologica, 55, 271-280" (Year: 2011).*

Ding Junhua et al: "A Machine Learning Based Framework for Verification and Validation of Massive Scale Image Data", IEEE Transactions on Big Data, IEEE, Mar. 9, 2017 (Mar. 9, 2017), pp. 451-467, vol. 7, No. 2, XP011857207, DOI: 10.1109/TBDATA. 2017.2680460 [retrieved on May 27, 2021].

Ding Junhua et al: "An Approach for Validating Quality of Datasets for Machine Learning", 2018 IEEE International Conference On Big Data (Big Data), IEEE, Dec. 10, 2018 (Dec. 10, 2018), pp. 2795-2803, XP033508606, DOI: 10.1109/BIGDATA.2018. 8622640 [retrieved on Jan. 22, 2019].

Hideharu Mikami, et al, "High-Speed Imaging Meets Single-Cell Analysis", Chem vol. 4, Issue 10, Oct. 11, 2018, pp. 2278-2300.

Junhua Ding et al: "Validating a deep learning framework by metamorphic testing", Metamorphic Testing, May 20, 2017 (May 20, 2017), pp. 28-34, IEEE Press, 445 Hoes Lane, Po Box 1331, Piscataway, NJ 08855-1331 USA, XP058339997, DOI: 10.1109/ MET.2017 .. 2 ISBN: 978-1-5386-0424-3.

\* cited by examiner

| Receiving input at a device. | 300 |

| Processing the input using a neural network. | 302 |

| Classifying the input. | 304 |

400

402    404    406    408    420

| Network Interface | Memory | Processor (CPU/GPU) | I/O | HW |

Bus

410

430

Application

Storage

412

SINGLE CELL IDENTIFICATION FOR CELL SORTING

FIELD OF THE INVENTION

The present invention relates to cell sorting. More specifically, the present invention relates to image-based cell sorting.

BACKGROUND OF THE INVENTION

Traditional Fluorescence-activated Cell Sorting (FACS) has no image information. FACS uses laser scatter signals of cells to detect noise events. FACS is incapable of distinguishing certain noise events which affects the accuracy of experiments and purity of the sort product.

SUMMARY OF THE INVENTION

The single cell identification described herein utilizes cell image information and extracts cell features with a neural network model to subtly distinguish the noise events from single cells, allowing the user to choose which different types of noise events to exclude depending on the requirement of applications. The fast neural network model is able to extract more abundant and specific cell features than handpicked features, which enables the model to be equipped with higher accuracy and higher discriminative capability of distinguishing noise events and identifying the single cells in real-time. Utilization of a neural network model for real-time single cell identification represents a novel technique never applied before. It allows high discriminative capability and high accuracy compared to traditional FACS (Fluorescence-activated Cell Sorting). The usefulness of this technique is to integrate with any brightfield (BF) model and fluorescence (FL) model to identify single cells for different downstream applications.

In one aspect, a method programmed in a non-transitory memory of a device comprises receiving input, processing the input using a neural network to identify a noise event or a single cell and classifying the input as the noise event or the single cell. The input comprises a plurality of cell images. The neural network comprises two convolutional layers and a fully connected layer. The neural network comprises a plurality of kernels to extract features with different fine-grained levels from the input. The noise event is selected from the group consisting of aggregate, debris, doublet, edge, out-of-focus, detached-bleb, and bleb. Classifying the input comprises labeling each image with the noise event or the single cell. The neural network is configured to classify more than 2,000 images per second. The method further comprises implementing a brightfield model or a fluorescence model in parallel with classifying the input.

In another aspect, an apparatus comprises a non-transitory memory for storing an application, the application for: receiving input, processing the input using a neural network to identify a noise event or a single cell and classifying the input as the noise event or the single cell and a processor coupled to the memory, the processor configured for processing the application. The input comprises a plurality of cell images. The neural network comprises two convolutional layers and a fully connected layer. The neural network comprises a plurality of kernels to extract features with different fine-grained levels from the input. The noise event is selected from the group consisting of aggregate, debris, doublet, edge, out-of-focus, detached-bleb, and bleb. Classifying the input comprises labeling each image with the noise event or the single cell. The neural network is configured to classify more than 2,000 images per second. The application is further configured for implementing a brightfield model or a fluorescence model in parallel with classifying the input.

In another aspect, a system comprises a first device configured for acquiring a cell image and a second device configured for: receiving the cell image, processing the cell image using a neural network to identify a noise event or a single cell and classifying the cell image as the noise event or the single cell. The neural network comprises two convolutional layers and a fully connected layer. The neural network comprises a plurality of kernels to extract features with different fine-grained levels from the input. The noise event is selected from the group consisting of aggregate, debris, doublet, edge, out-of-focus, detached-bleb, and bleb. Classifying the cell image comprises labeling the cell image with the noise event or the single cell. The neural network is configured to classify more than 2,000 images per second. The second device is further configured for implementing a brightfield model or a fluorescence model in parallel with classifying the input.

DETAILED DESCRIPTION OF THE PREFERRED EMBODIMENT

Samples for a flow cytometer will contain the desired single cells in suspension along with noise events such as aggregates, doublets, and debris. In addition, some cells will arrive off center, resulting in cells that are out of focus or off to the edge of the interrogation region. Finally, some cells will show blebbing (both attached and detached) which may indicate cell stress and damage. Traditional flow cytometry based cell sorters have limited capability of excluding noise events from single cells in a sample since it has no image information. Traditional cell sorting uses laser scatter signals of cells to exclude distinct noise cells (doublet, clumps, debris) but fails in distinguishing other noise events (edge, out of focus, bleb, detached-bleb). This affects the accuracy of experiments and purity of the sorted populations. The single cell identification described herein utilizes cell image information and extracts cell features with a neural network model to subtly distinguish the noise events from single cells, allowing the user to choose which different types of noise events to exclude depending on the requirement of applications.

The fast neural network model described herein is able to extract more abundant and specific cell features than handpicked features, which enables the model to be equipped with higher accuracy and higher discriminative capability of distinguishing noise events and identifying the single cells in real-time.

Utilization of the neural network model for real-time single cell identification represents a novel technique never applied before. It allows high discriminative capability and high accuracy compared to traditional FACS (Fluorescence-activated Cell Sorting). The usefulness of this technique is to integrate with any brightfield (BF) model and fluorescence (FL) model to identify single cells for different downstream applications.

Figure 1:
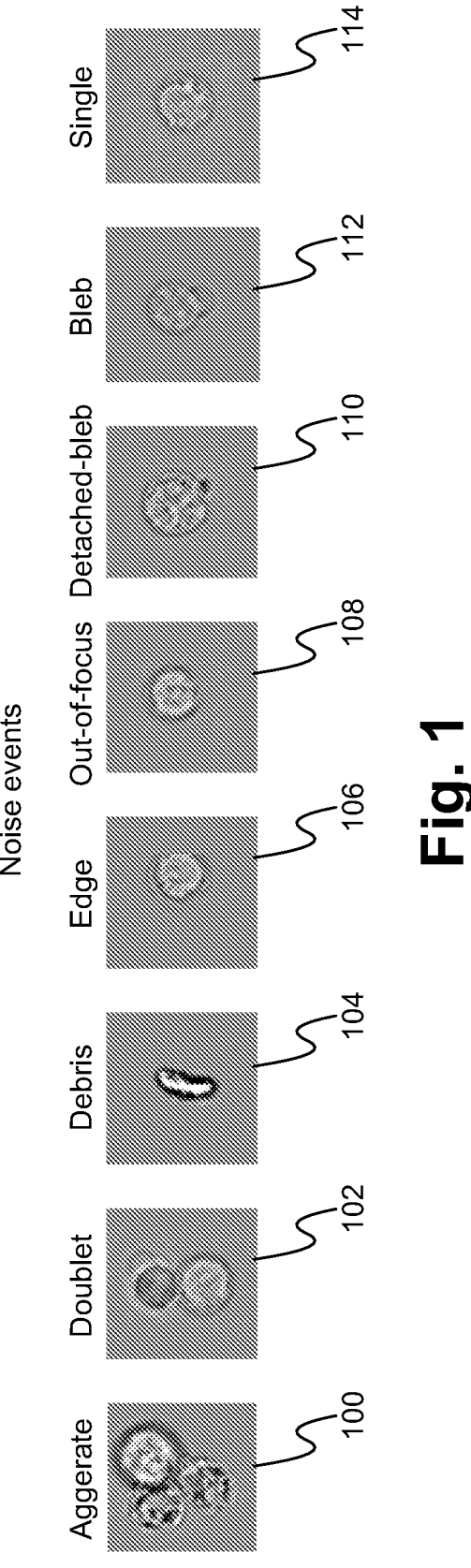
FIG. 1 illustrates images of exemplary noise events according to some embodiments.

FIG. 1 illustrates images of exemplary noise events according to some embodiments. Noise events include an aggregate 100, a doublet 102, debris 104, an edge 106, out-of-focus 108, a detached-bleb 110, and a bleb 112, as opposed to a single cell 114. An aggregate 100 includes multiple cells, whereas a doublet 102 includes two cells. Debris 104 is an artifact that is not the single cell. An edge 106 of a cell may be missing, or the cell may be out-of-focus 108. A detached-bleb 110 is a detached bubble, and a bleb 112 is an attached bubble or rounded outgrowth on the surface of a cell.

Traditional FACS has no image information and is only able to exclude a subset of the noise events which are present in every sample. FACS is able to distinguish aggregates, doublets and debris from single cells since it uses laser scatter signals of cells to detect noise events. FACS is incapable of distinguishing between other noise events (e.g., bleb, detached bleb, out-of-focus, and edge) and single cells. This affects the accuracy of experiments and purity of the sort product. In other words, FACS is able to determine a binary of whether an image is of a single cell or not; whereas, in the single cell identification implementation described herein, there are different noise classes. Depending on the application, a user may want to allow images with specific noise classes. For example, if a user is performing a rare event sort, and the user wants as many possible target cells to be sorted, then images with bleb events, edge events and slightly out-of-focus events are able to be included in the sort, since the user does not want to exclude potentially useful information. Since images are able to be more finely classified based on noise events, further processing is also able to be limited or broadened based on the noise events.

For example, Table 1 illustrates the differences between FACS and potential single cell identification implementations.

TABLE 1

| Noise Events | Excluded Cells | Cells of Interest |
|---|---|---|
| FACS | Aggregate, Debris, Doublet | Edge, Oof, D-bleb, bleb, single |
| 5-Class (5C) | Aggregate, Debris, Doublet, Edge, Oof | D-bleb, bleb, single |
| 6-Class (6C) | Aggregate, Debris, Doublet, Edge, Oof, D-bleb | Bleb, single |
| 7-Class (7C) | Aggregate, Debris, Doublet, Edge, Oof, D-bleb, bleb | Single |

Figure 2:
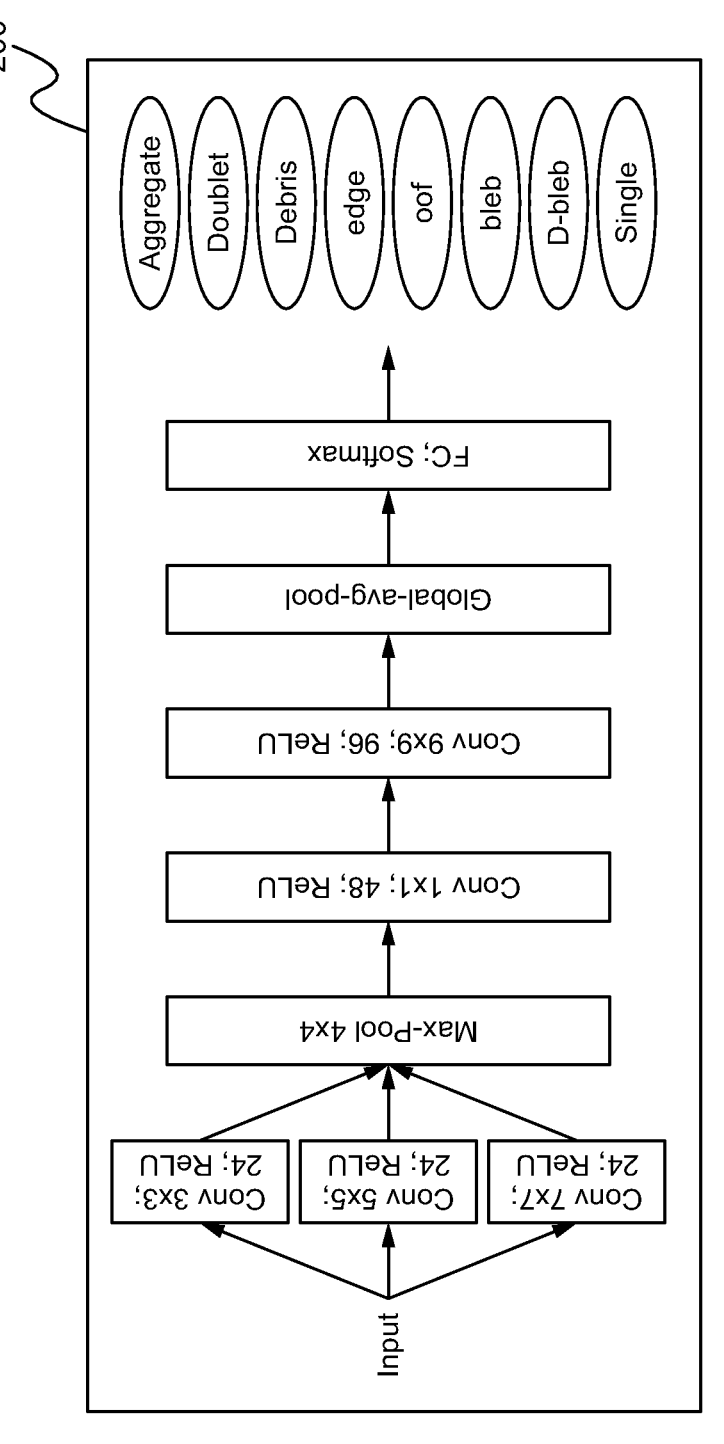
FIG. 2 illustrates a diagram of a neural network architecture configured to implement single cell identification according to some embodiments.

FIG. 2 illustrates a diagram of a neural network architecture configured to implement single cell identification according to some embodiments. The neural network 200 includes a module with two convolutional layers and one fully connected layer. The neural network 200 includes multiple kernels to extract abundant features with different fine-grained levels. The neural network 200 is able to processes greater than 2,000 images per second using a 2080Ti GPU. The neural network 200 is highly accurate: 98.6% precision with 97.3% recall for single cell identification when excluding 5C noise events on the public available WBC2020 dataset. The neural network 200 is able to be integrated with a cell-type classifier module. Although a specific exemplary neural network architecture is described, the neural network 200 is not limited to a specific architecture. For example, the neural network 200 is able to include fewer, additional or different components such as fewer convolutional layers, multiple GPUs or a different GPU.

The neural network 200 receives input (e.g., many images of cells), processes the input as described herein using machine learning to extract features and generate an output such as labeling each image with one or more noise events or as a single cell. The neural network is able to be trained using multiple datasets.

The neural network 200 is able to be implemented in a BF application by being parallelized with a BF cell type classifier by sharing a feature extractor. The neural network 200 is able to be implemented in an FL application by being parallelized with an FL cell type classifier on a GPU. The neural network 200 is also able to be used in conjunction with cell sorting applications such as nuclear translocation, immunoflowfish, extracellular vesicles and others.

Figures 3, 4:
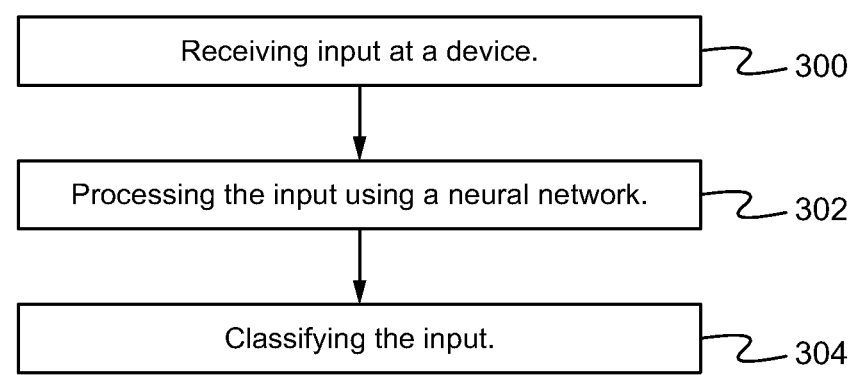
FIG. 3 illustrates a flowchart of a method of implementing single cell identification for cell sorting according to some embodiments.
FIG. 4 illustrates a block diagram of an exemplary computing device configured to implement the single cell identification method according to some embodiments.

FIG. 3 illustrates a flowchart of a method of implementing single cell identification for cell sorting according to some embodiments. In the step 300, input is received at a device. The input is able to include cell images and/or other content.

In the step 302, the input is processed using a neural network. The neural network includes two convolutional layers and one fully connected layer, where multiple kernels extract features with different fine-grained levels from the input. Processing the input includes using machine learning to distinguish noise and identify noise events. For example, the neural network learns distinguishing factors: such as detecting more than two circular objects to determine an aggregate; detecting spots and lines that are not part of the cell to determine debris; detecting two circular objects to determine a doublet; detecting a mostly circular object with part of the circle missing to determine an edge; detecting blur or distorted lines to determine out-of-focus; detecting a detached circle smaller than the cell to determine a detached-bleb; and detecting an attached circle smaller than the cell to determine a bleb. The neural network is also able to learn that if none of the noise events are detected, then a single cell is determined.

In the step 304, the input is classified. For example, an input is classified as having a noise event (e.g., aggregate, debris, doublet, edge, out-of-focus, detached-bleb, bleb) or a single cell. For example, each image of the input is labeled with a noise event or as a single cell. In some embodiments, if more than one noise event is detected, the image is classified and/or labeled with both noise events. In some embodiments, if more than one noise event is detected, the image is classified and/or labeled with the more prominent noise event as determined by the machine language.

The method is able to be implemented such that more than 2,000 images are classified per second using a 2080Ti GPU with a >98.6% precision and >97.3% recall for single cell identification when screening out 5C noise events.

In some embodiments, fewer or additional steps are implemented. For example, the method of implementing single cell identification is able to be integrated with a BF application or an FL application. In another example, the neural network is trained using multiple datasets before additional input is processed. In some embodiments, the order of the steps is modified.

FIG. 4 illustrates a block diagram of an exemplary computing device configured to implement the single cell identification method according to some embodiments. The computing device 400 is able to be used to acquire, store, compute, process, communicate and/or display information such as images and videos including 3D content. The computing device 400 is able to implement any of the encoding/decoding aspects. In general, a hardware structure suitable for implementing the computing device 400 includes a network interface 402, a memory 404, a processor 406, I/O device(s) 408, a bus 410 and a storage device 412. The choice of processor is not critical as long as a suitable processor with sufficient speed is chosen. The processor 406 is able to include one or more Central Processing Units (CPUs) and/or one or more Graphics Processing Units (GPUs) such as a 2080 Ti GPU. The memory 404 is able to be any conventional computer memory known in the art. The storage device 412 is able to include a hard drive, CDROM, CDRW, DVD, DVDRW, High Definition disc/drive, ultra-HD drive, flash memory card or any other storage device. The computing device 400 is able to include one or more network interfaces 402. An example of a network interface includes a network card connected to an Ethernet or other type of LAN. The I/O device(s) 408 are able to include one or more of the following: keyboard, mouse, monitor, screen, printer, modem, touchscreen, button interface and other devices. Single cell identification application(s) 430 used to implement the single cell identification implementation are likely to be stored in the storage device 412 and memory 404 and processed as applications are typically processed. More or fewer components shown in FIG. 4 are able to be included in the computing device 400. In some embodiments, single cell identification hardware 420 is included. Although the computing device 400 in FIG. 4 includes applications 430 and hardware 420 for the single cell identification implementation, the single cell identification method is able to be implemented on a computing device in hardware, firmware, software or any combination thereof. For example, in some embodiments, the single cell identification applications 430 are programmed in a memory and executed using a processor. In another example, in some embodiments, the single cell identification hardware 420 is programmed hardware logic including gates specifically designed to implement the single cell identification method.

In some embodiments, the single cell identification application(s) 430 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle) or any other suitable computing device.

In some embodiments, a first computing device (e.g., microscope/camera configuration) captures cell images and communicates the images to a second computing device to implement the single cell identification method to process and classify the images.

To utilize the single cell identification method, a device acquires or receives cell images to sort. The single cell identification method is able to be implemented with user assistance or automatically without user involvement.

In operation, the single cell identification described herein is able to distinguish single cells from any number (e.g., 7) types of noise events, allowing a user to choose which different types of noise events to exclude depending on the requirement of an application. The single cell identification is able to be implemented as a neural network-based single cell identification module.

The neural network-based module extracts better features and achieves better performance than handpicked features for single cell identification.

The high-speed single cell identification module is able to be integrated with any BF or FL downstream application.

Some Embodiments of Single Cell Identification for Cell Sorting

1. A method programmed in a non-transitory memory of a device comprising:
   receiving input;
   processing the input using a neural network to identify a noise event or a single cell; and classifying the input as the noise event or the single cell.
2. The method of clause 1 wherein the input comprises a plurality of cell images.
3. The method of clause 1 wherein the neural network comprises two convolutional layers and a fully connected layer.
4. The method of clause 1 wherein the neural network comprises a plurality of kernels to extract features with different fine-grained levels from the input.
5. The method of clause 1 wherein the noise event is selected from the group consisting of aggregate, debris, doublet, edge, out-of-focus, detached-bleb, and bleb.
6. The method of clause 1 wherein classifying the input comprises labeling each image with the noise event or the single cell.
7. The method of clause 1 wherein the neural network is configured to classify more than 2,000 images per second.
8. The method of clause 1 further comprising implementing a brightfield model or a fluorescence model in parallel with classifying the input.
9. An apparatus comprising:
   a non-transitory memory for storing an application, the application for:
   receiving input;
   processing the input using a neural network to identify a noise event or a single cell; and
   classifying the input as the noise event or the single cell; and
   a processor coupled to the memory, the processor configured for processing the application.
10. The apparatus of clause 9 wherein the input comprises a plurality of cell images.
11. The apparatus of clause 9 wherein the neural network comprises two convolutional layers and a fully connected layer.
12. The apparatus of clause 9 wherein the neural network comprises a plurality of kernels to extract features with different fine-grained levels from the input.
13. The apparatus of clause 9 wherein the noise event is selected from the group consisting of aggregate, debris, doublet, edge, out-of-focus, detached-bleb, and bleb.

14. The apparatus of clause 9 wherein classifying the input comprises labeling each image with the noise event or the single cell.

15. The apparatus of clause 9 wherein the neural network is configured to classify more than 2,000 images per second.

16. The apparatus of clause 9 wherein the application is further configured for implementing a brightfield model or a fluorescence model in parallel with classifying the input.

17. A system comprising:
    a first device configured for acquiring a cell image; and
    a second device configured for:
        receiving the cell image;
        processing the cell image using a neural network to identify a noise event or a single cell; and
        classifying the cell image as the noise event or the single cell.

18. The system of clause 17 wherein the neural network comprises two convolutional layers and a fully connected layer.

19. The system of clause 17 wherein the neural network comprises a plurality of kernels to extract features with different fine-grained levels from the input.

20. The system of clause 17 wherein the noise event is selected from the group consisting of aggregate, debris, doublet, edge, out-of-focus, detached-bleb, and bleb.

21. The system of clause 17 wherein classifying the cell image comprises labeling the cell image with the noise event or the single cell.

22. The system of clause 17 wherein the neural network is configured to classify more than 2,000 images per second.

23. The system of clause 17 wherein the second device is further configured for implementing a brightfield model or a fluorescence model in parallel with classifying the input.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method programmed in a non-transitory memory of a device comprising:
    receiving input;
    processing the input using a neural network to identify a noise event;
    processing the input using the neural network to identify a single cell, wherein the neural network comprises two convolutional layers and a fully connected layer, wherein the neural network comprises a plurality of kernels to extract features with different fine-grained levels from the input, wherein the neural network is configured to classify more than 2,000 images per second;
    classifying the input as the noise event based on processing the input;
    classifying the input as the single cell based on processing the input, wherein classifying the input as the single cell based on processing the input includes bleb events and out-of-focus events when an increased target cell amount is determined; and
    implementing a brightfield model or a fluorescence model in parallel with classifying the input.

2. The method of claim 1 wherein the input comprises a plurality of cell images.

3. The method of claim 1 wherein the noise event is selected from the group consisting of aggregate, debris, doublet, edge, out-of-focus, detached-bleb, and bleb.

4. The method of claim 1 wherein classifying the input comprises labeling each image with the noise event or the single cell.

5. The method of claim 1 wherein when the input is classified as the noise event in a classification of out-of-focus, detached-bleb or bleb, the input is retained for further analysis including cell sorting.

6. An apparatus comprising:
    a non-transitory memory for storing an application, the application for:
        receiving input;
        processing the input using a neural network to identify a noise event;
        processing the input using the neural network to identify a single cell, wherein the neural network comprises two convolutional layers and a fully connected layer, wherein the neural network comprises a plurality of kernels to extract features with different fine-grained levels from the input, wherein the neural network is configured to classify more than 2,000 images per second; and
        classifying the input as the noise event based on processing the input;
        classifying the input as the single cell based on processing the input; and
        implementing a brightfield model or a fluorescence model in parallel with classifying the input; and
    a processor coupled to the memory, the processor configured for processing the application.

7. The apparatus of claim 6 wherein the input comprises a plurality of cell images.

8. The apparatus of claim 6 wherein the noise event is selected from the group consisting of aggregate, debris, doublet, edge, out-of-focus, detached-bleb, and bleb.

9. The apparatus of claim 6 wherein classifying the input comprises labeling each image with the noise event or the single cell.

10. A system comprising:
    a microscope configured for acquiring a cell image; and
    a computer configured for:
        receiving the cell image;
        processing the cell image using a neural network to identify a noise event;
        processing the input using the neural network to identify a single cell, wherein the neural network comprises two convolutional layers and a fully connected layer, wherein the neural network comprises a plurality of kernels to extract features with different fine-grained levels from the input, wherein the neural network is configured to classify more than 2,000 images per second;
        classifying the cell image as the noise event based on processing the cell image;
        classifying the cell image as the single cell based on processing the cell image; and
        implementing a brightfield model or a fluorescence model in parallel with classifying the input.

11. The system of claim 10 wherein the noise event is selected from the group consisting of aggregate, debris, doublet, edge, out-of-focus, detached-bleb, and bleb.

12. The system of claim 10 wherein classifying the cell image comprises labeling the cell image with the noise event or the single cell.

* * * * *